United States Patent
Kumano et al.

(10) Patent No.: US 12,211,058 B2
(45) Date of Patent: Jan. 28, 2025

(54) RESPONSE STYLE COMPONENT REMOVAL DEVICE, RESPONSE STYLE COMPONENT REMOVAL METHOD, AND PROGRAM

(71) Applicant: NIPPON TELEGRAPH AND TELEPHONE CORPORATION, Tokyo (JP)

(72) Inventors: Shiro Kumano, Tokyo (JP); Keishi Nomura, Tokyo (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 18 days.

(21) Appl. No.: 17/633,193

(22) PCT Filed: Jul. 27, 2020

(86) PCT No.: PCT/JP2020/028628
§ 371 (c)(1),
(2) Date: Feb. 5, 2022

(87) PCT Pub. No.: WO2021/024824
PCT Pub. Date: Feb. 11, 2021

(65) Prior Publication Data
US 2022/0335455 A1  Oct. 20, 2022

(30) Foreign Application Priority Data
Aug. 8, 2019 (JP) ................................. 2019-146057

(51) Int. Cl.
*G06Q 30/0203* (2023.01)
*G06N 20/00* (2019.01)

(52) U.S. Cl.
CPC ......... *G06Q 30/0203* (2013.01); *G06N 20/00* (2019.01)

(58) Field of Classification Search
CPC .... G06Q 30/0202; G06Q 30/02; G06N 20/00; G06N 7/01
See application file for complete search history.

(56) References Cited

U.S. PATENT DOCUMENTS 10,726,431 B2* 7/2020 Weiss ................. G06Q 30/0203
10,740,705 B2* 8/2020 Joi ....................... G06Q 10/063
(Continued)

FOREIGN PATENT DOCUMENTS

JP 2021026647 A * 2/2021 ............. G06N 20/00

OTHER PUBLICATIONS

Shiro Kumano and Keishi Nomura, Multitask Item Response Models for Response Bias Removal from Affective Ratings, Jun. 2019, IEEE 978-1-7281-3888 (Year: 2019).*

(Continued)

*Primary Examiner* — Dylan C White

(57) ABSTRACT

A response style component removal device capable of removing a response style that does not depend on content of a questionnaire is provided. The response style component removal device generates a probability of rating values for question items from raters who have rated questionnaires. Specifically, learning data for training the device include rating values for a plurality of question items from a plurality of raters who have rated a plurality of types of questionnaires. The device is configured to learn a rater parameter $\theta_k$ that indicates a tendency of each rater, an item parameter $\beta_k$ that indicates a tendency of each question item, and a response style parameter $\gamma$ indicates a tendency of a response style, the rater parameter $\theta_k$, the item parameter $\beta_k$. The device is further configured to remove the response style parameter $\gamma$ to generate a probability distribution of the rating value.

20 Claims, 5 Drawing Sheets

(56) References Cited

U.S. PATENT DOCUMENTS

| | | | |
|---|---|---|---|
| 11,205,028 B2* | 12/2021 | Albert | G06F 30/20 |
| 11,502,975 B2* | 11/2022 | Gershony | H04L 51/04 |
| 11,574,326 B2* | 2/2023 | Morningstar | G06Q 30/0203 |
| 2017/0316442 A1* | 11/2017 | Ni | G06Q 30/0203 |
| 2021/0174702 A1* | 6/2021 | Ishii | G10L 15/02 |
| 2021/0275911 A1* | 9/2021 | Padmanabhan | G06F 16/35 |
| 2022/0147818 A1* | 5/2022 | Zhang | G06N 3/047 |
| 2023/0196116 A1* | 6/2023 | Liss | G06N 7/01 |
| | | | 706/25 |

OTHER PUBLICATIONS

Tutz et al. (2018) "Response styles in the partial credit model" Applied Psychological Measurement, vol. 42, No. 6, pp. 407-427.

Jonas et al. (2019) "Modeling response style using vignettes and person-specific item response theory" Applied Psychological Measurement, vol. 43, No. 1, pp. 3-17.

Baumgartner et al. (2001) "Response styles in marketing research: A cross-national investigation" Journal of Marketing Research, vol. 38, No. 2, pp. 143-156.

\* cited by examiner

RESPONSE STYLE COMPONENT REMOVAL DEVICE, RESPONSE STYLE COMPONENT REMOVAL METHOD, AND PROGRAM

CROSS-REFERENCE TO RELATED APPLICATIONS

This application is a U.S. National Stage Application filed under 35 U.S.C. § 371 claiming priority to International Patent Application No. PCT/JP2020/028628, filed on 27 Jul. 2020, which application claims priority to and the benefit of JP Application No. 2019-146057, filed on 8 Aug. 2019, the disclosures of which are hereby incorporated herein by reference in their entireties.

TECHNICAL FIELD

The present invention relates to a response style component removal device, a response style component removal method, and a program.

BACKGROUND ART

A response style (RS) is a tendency of an evaluator who selects a specific category such as extreme rating values (at both ends) or a middle rating value regardless of content to be evaluated (NPL 1 and NPL 2). The most common types of RS are an acquiescent/dis-acquiescent response style (ARS/DRS), that is, a tendency of selecting a highest score (positive) or a lowest score (negative) among options, and an extreme response style/mid-point response style (ERS/MRS) in which values at both ends or a mid-point value is preferred (NPL 3). The response style depends on culture, and it is said that Asians such as Japanese have a strong tendency of selecting a middle rating value. The RS is known to reduce the validity of subjective evaluation analysis such as correlation analysis or variance analysis.

In the related art, such an RS has been measured using a simple method. For example, the extreme response style is often measured as a percentage at which options at both ends among all items are selected (NPL 3). However, in these methods, the RS cannot be excluded from response data.

Several technologies for removing the RS have already been proposed mainly in fields such as marketing research (NPL 1). Specifically, an evaluation process model having an RS as a latent variable is constructed to eliminate an influence of the RS.

CITATION LIST

Non Patent Literature

NPL 1: G. Tutz, G. Schauberuer, and M. Berger, "Response styles in the partial credit model," Applied Psychological Measurement, vol. 42, no. 6, pp. 407-427, 2018.

NPL 2: H K. G Jonas and K. E. Markon, "Modeling response style using vignettes and person-specific item response theory," Applied Psychological Measurement, vol. 43, no. 1, pp. 3-17, 2019.

NPL 3: H. Baumgartner and J. B. E. Steenkamp, "Response styles in marketing research: A cross-national investigation," Journal of Marketing Research, vol. 38, no. 2, pp. 143-156, 2001.

SUMMARY OF THE INVENTION

Technical Problem

Because the RS has a property of being not related to the content of a questionnaire (called content independence), the RS should be consistently observed for various questionnaires, such as psychological questionnaires or satisfaction evaluations. However, in an existing RS removal method (NPL 1), this property is not used and the RS is removed from only a single questionnaire. Therefore, in the method of NPL 1, it is difficult to distinguish between a response style depending on a questionnaire and an RS not depending on the questionnaire. The two types of responses are called "dispositional" and "situational", and details thereof are disclosed in NPL 3 and the like. In these methods, estimation results may differ depending on items or options to be used. For example, even in the case of the same rater, he/she can be assumed to have an extreme response style when a degree of smile is evaluated with respect to a set of facial images including only a visible smile image and visibly expressionless image, and he/she can be assumed to have a mid-point response style when an ethical question is asked in which it is difficult to judge between right and wrong with the three options of "Good", "Neither", and "Bad". However, this is inconsistent with the content independence of the RS.

Therefore, an object of the present invention is to provide a response style component removal device capable of removing a RS that does not depend on the content of a questionnaire.

Means for Solving the Problem

The response style component removal device of the present invention includes a parameter learning unit, and a response style component-removed probability distribution generation unit.

The parameter learning unit uses, as learning data, rating values for a plurality of question items from a plurality of raters who have rated all of K types of questionnaires (K is an integer equal to or greater than 2), each of the K types of questionnaires including the plurality of question items, to learn a rater parameter $\theta_k$ that depends on at least an index k (k=1, . . . , K) of each questionnaire and indicates a tendency of each rater, an item parameter $\beta_k$ that depends on at least the index k of each questionnaire and indicates a tendency of each question item, and a response style parameter $\gamma$ that does not depend on at least the index k of each questionnaire and indicates a tendency of a response style, the rater parameter $\theta_k$, the item parameter $\beta_k$, and the response style parameter $\gamma$ being parameters describing the rating values. The response style component-removed probability distribution generation unit removes, among the rater parameter $\beta_k$, the item parameter $\beta_k$, and the response style parameter $\gamma$ that have been learned, the response style parameter $\gamma$ to generate a probability distribution of the rating value.

Effects of the Invention

According to the response style component removal device of the present invention, it is possible to remove a RS that does not depend on the content of the questionnaire.

DESCRIPTION OF EMBODIMENTS

Hereinafter, embodiments of the present invention will be described in detail. Components having the same function are denoted by the same reference signs, and repeated description thereof will be omitted.

In the following embodiments, there is proposed an RS removal method (a hierarchical RS removal method) that enables an RS removal method of the related art to handle a plurality of questionnaires at the same time in a hierarchical Bayes framework. Hierarchical Bayes is one statistical model scheme, and is a mechanism for learning models for solving a plurality of related questionnaires at the same time, thereby efficiently learning a relationship used in common between questionnaires and a relationship different between questionnaires. For example, a face recognition questionnaire and a facial expression recognition questionnaire in image recognition are taken as examples. In this case, a common relationship is what the eyes or mouth look like and whether they are included in an image to be examined, and different relationships are, for example, placement information of these facial portions in the case of face recognition and information on change of these facial portions from the time of no expression in the case of facial expression recognition. In the following embodiments, in various types of questionnaires, a common relationship between questionnaires is used as a response style. In the following embodiments, different relationships between questionnaires are defined as a nature of an item (for example, each question) in each questionnaire or characteristics/capability of individual responding persons. In the following embodiments, a response style is introduced in a hierarchical Bayesian framework based on an item response theory model (IRT model) for estimating characteristics of items and individuals in a single questionnaire. A method for estimating the model parameters can be freely determined, but in the present embodiment, the model parameters are estimated using Markov chain Monte Carlo methods (MCMC). Thereby, parameters of a response style of the individual, parameters of each item in each questionnaire, and parameters of individual characteristics are estimated. An estimated value of the response from which the response style has been removed can be obtained by using the parameters other than the parameter of the response style after the parameters are estimated.

Embodiment 1

Figure 1:
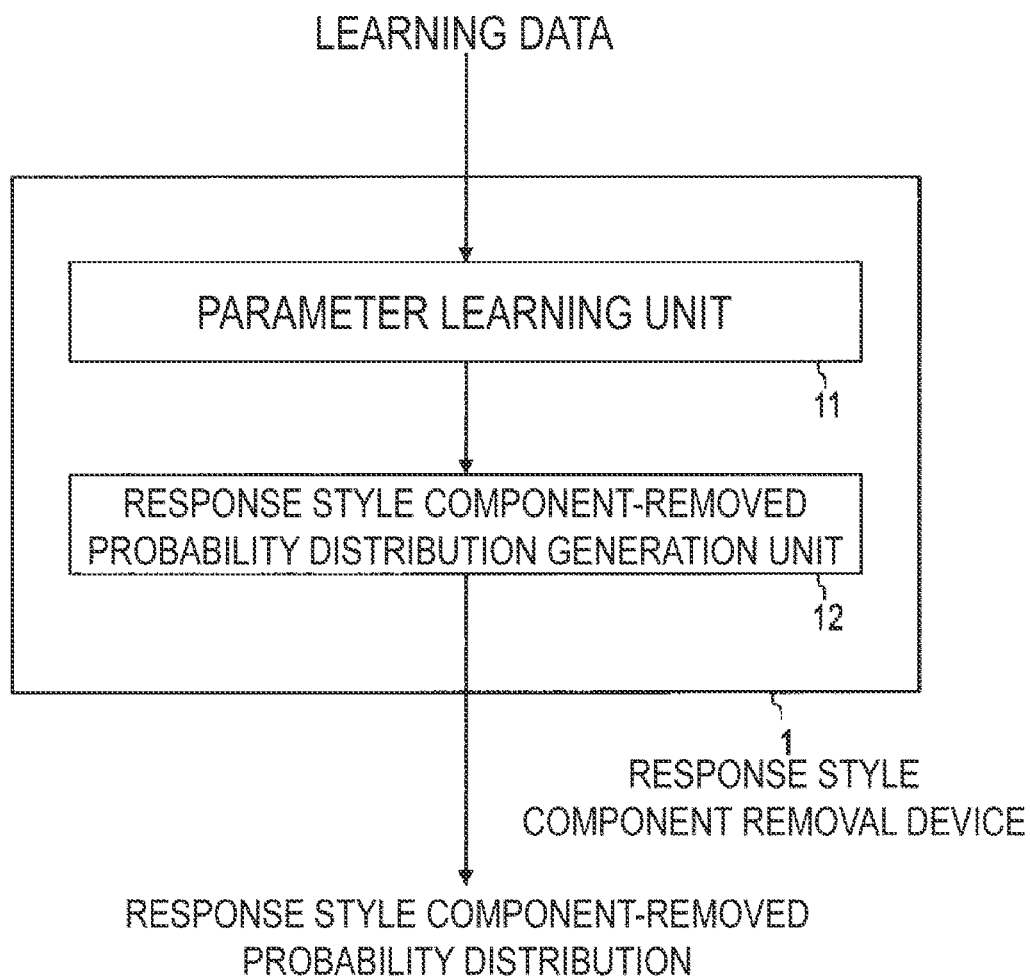
FIG. 1 is a block diagram illustrating a configuration of a response style component removal device according to Embodiment 1.
Figure 2:
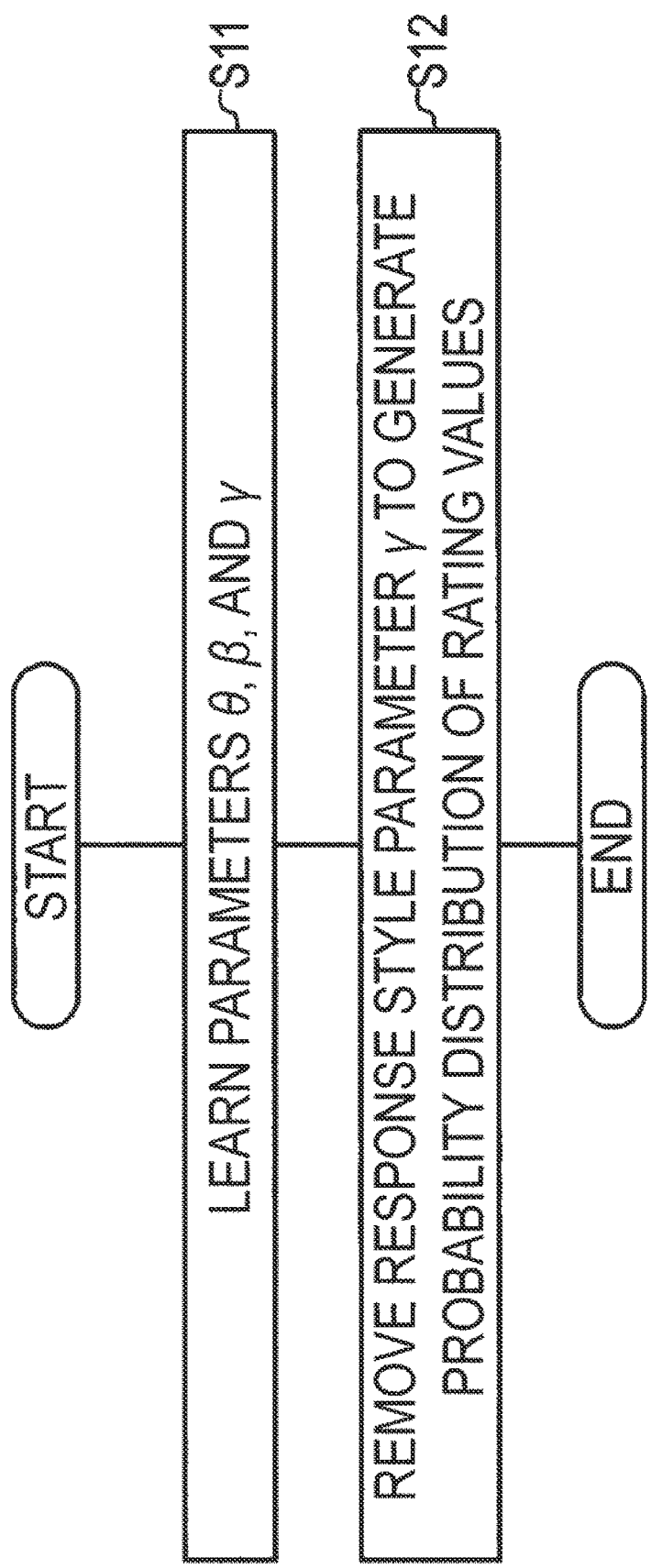
FIG. 2 is a flowchart illustrating an operation of the response style component removal device according to Embodiment 1.

Hereinafter, a configuration of the response style component removal device of Embodiment 1 will be described with reference to FIG. 1. As illustrated in FIG. 1, the response style component removal device 1 of Embodiment 1 includes a parameter learning unit 11 and a response style component-removed probability distribution generation unit 12. Hereinafter, an operation of respective components will be described with reference to FIG. 2.

The parameter learning unit 11 uses, as learning data, rating values for a plurality of question items from a plurality of raters who have rated all of K types of questionnaires (K is an integer equal to or greater than 2) each including the plurality of question items to learn a rater parameter $\theta_k$ that depends on at least an index k (k=1, ..., K) of each questionnaire and indicates a tendency of each rater, an item parameter $\beta_k$ that depends on at least the index k of each questionnaire and indicates a tendency of each question item, and a response style parameter $\gamma$ that does not depend on at least the index k of each questionnaire and indicates a tendency of a response style, the rater parameter $\theta_k$, the item parameter $\beta_k$, and the response style parameter $\gamma$ being parameters describing the rating values (S11).

The response style component-removed probability distribution generation unit 12 removes the response style parameter $\gamma$ among the rater parameter $\theta_k$, the item parameter $\beta_k$, and the response style parameter $\gamma$ that have been learned to generate a probability distribution of the rating value (S12).

Hereinafter, an operation of each component will be described in more detail.

Parameter Learning Unit 11

When the rating has a discrete value such as a Likert scale, log odds $X_\varphi$ of a probability of a rating value y becoming s and a probability of the rating value y becoming s−1 are defined as follows.

[Math. 1]

$$\log\left(\frac{p(y_{ij} = s \mid \varphi)}{p(y_{ij} = s-1 \mid \varphi)}\right) = X_\varphi \quad (1)$$

$$X_\varphi = \theta_{jk} - (\beta_{iks} + \overline{\gamma}_{js}) \quad (2)$$

Here, i indicates the index of the question item, j indicates the index of the rater, and k indicates the index of the questionnaire. $\varphi$ is a set of model parameters and includes the item parameter $\beta$, the rater parameter $\theta$, and the response style parameter $\gamma$. $\overline{\gamma}_{js}$ indicates an effect for an item parameter of the response style, and here, $\overline{\gamma}_{js}$=(m−s+1)$\gamma_j$. m is a median of options (for example, m=2 when the options are in five steps of 0, 1, 2, 3, and 4), and $\gamma$ is the response style parameter indicating the extreme/mid-point response style.

Here, art important point is that the response style parameter $\gamma$ does not include the questionnaire k, that is, that the response style parameter $\gamma$ does not depend on the index k (k=1, ..., K) of the questionnaire, and the response style parameter has any format to that extent. First, a left side of Equation (1) is a term indicating an order regression called a link function, and any function can be used. Further, a right side of Equation (2) is a linear predictor, and any format can be also used. For example, the right side of Equation (2) may be as follows:

[Math. 2]

$$X_\varphi = \alpha_{jk}\theta_{jk} - \gamma_j(\beta_{ijk} + \gamma_j) \quad (3)$$

Here, $\gamma'$ indicates a positive/negative response style. When the rating is a continuous value (for example, any number between 0 and 100), an identity function is used as the above link function.

Therefore, the parameter learning unit 11 uses, as learning data, the log odds $X_\varphi$ based on the rating values y for the plurality of question items (see Equation (1)) from the plurality of raters who have rated all of the K types of questionnaires each including the plurality of question items to learn a rater parameter $\theta_{jk}$ that depends on the index k (k=1, . . . , K) of each questionnaire and the index j of each rater and indicates a tendency of the rater, an item parameter $\theta_{iks}$ that depends on the index k of each questionnaire, the index i of each question item, and the index s of each rating value and indicates a tendency of the question item, and the response style parameter $\gamma^-_{js}$ or $\gamma_j$ and $\gamma'_j$ that does not depends on at least the index k of each questionnaire, depends on the index j of each rater and the index s of each rating value, and indicates a tendency of the response style, as shown in Equations (2) and (3) (S11).

Response Style Component-Removed Probability Distribution Generation Unit 12

When the model parameter is estimated in step S11, it is possible to further estimate a rating value that is generated from the model. An estimated value ŷ of the rating value is estimated as follows.

[Math. 3]

$$\hat{y}_{ijk} \sim \text{categorical}(\varphi) \quad (4)$$

$$\varphi_s = P(y=s|\varphi) \quad (5)$$

Here, categorical ( ) indicates a categorical distribution. This makes it possible to perform estimation if a required parameter set $\varphi$ is known even when a rating value is not actually observed.

Further, the rating value from which the RS has been removed is estimated by excluding the response style parameter $\gamma$ from the linear predictor $X_\varphi$.

Specifically, when Equation (2) is used, the following equations can be obtained.

[Math. 4]

$$\varphi_s = P(y=s|\varphi') \quad (5')$$

$$X'_\varphi = \theta_{jk} - \beta_{iks} \quad (6)$$

Therefore, the response style component-removed probability distribution generation unit 12 removes the response style parameter $\gamma$ ($\gamma^-_{js}$ or $\gamma_j$, $\gamma'_j$ in the above example) among the respective parameters, uses, for example, Equation (6) instead of Equation (2) to obtain log odds $X'_\varphi$, and generates a probability distribution of the rating value y from which the response style component has been removed, from the obtained log odds $X'_\varphi$, as described in Equation (5') (S12).

In the present embodiment, the parameters were estimated using a No-U-Turn Sampler (NUTS) using RStan. A weak prior distribution was used for a prior distribution of each parameter. When four MCMC chains were executed from random initial values, an R hat value converged to 1.1 or less. A posterior distribution of all parameters such as $\varphi$ and ŷ was calculated by discarding the first 2,400 iterations as a warm-up and using a total of 9,600 samples in which the second 2,400 iterations were obtained from respective chains, Demonstration Experiment Fifty Japanese university students (equal numbers of men and women) participated in a demonstration experiment. The participants evaluated emotional valence (positive or negative) and arousal (excitement or sedation) in five steps with respect to all 150 artificially generated facial expression face images of people. The participants evaluated the emotional valence with respect to all 150 images and then evaluated the arousal with respect to all the 150 images, or performed the evaluations in the opposite order. The participants then responded to seven types of psychological scale questionnaires. The seven scales were empathy index (EQ), systematization index (SQ), autism spectrum index (AQ), multidimensional empathy scale (IRI), Bit, Five scale (Big Five), emotional skills and competence questionnaire (ESCQ), and the Tokyo University Type Egogram (TEG). The numbers of respective question items were 60, 60, 50, 28, 60, 28, and 53 in order, and the number of respective options of the responses were 4, 4, 4, 3, 5, 4, and 7. That is, all the participants completed a total of nine questionnaires (a total of 579 items), and a total number of responses obtained from 50 people was 31,950. Although no data was missing, a Bayesian generative model is used in the present embodiment, and missing values may be present.

Experimental Results

The estimated response style parameter (extreme/midpoint response style parameter) $\gamma$ showed a strong correlation with a score of extreme response style calculated using a classical method (a percentage at which options at both ends were selected among all the question items) (Spearman $\rho=0.92$, $p<0.001$). The reason why the correlation is a negative correlation is because the smaller the $\gamma$, the more the extreme response style, whereas, in the classical method, the higher the score, the more the extreme response style.

Embodiment 2

In Embodiment 1, "a plurality of different questionnaires" are shown as an example, but when there are a plurality of different parts or a plurality of different measurement targets in one questionnaire, it is possible to remove the response style component using the same method as in Embodiment 1.

Figure 3:
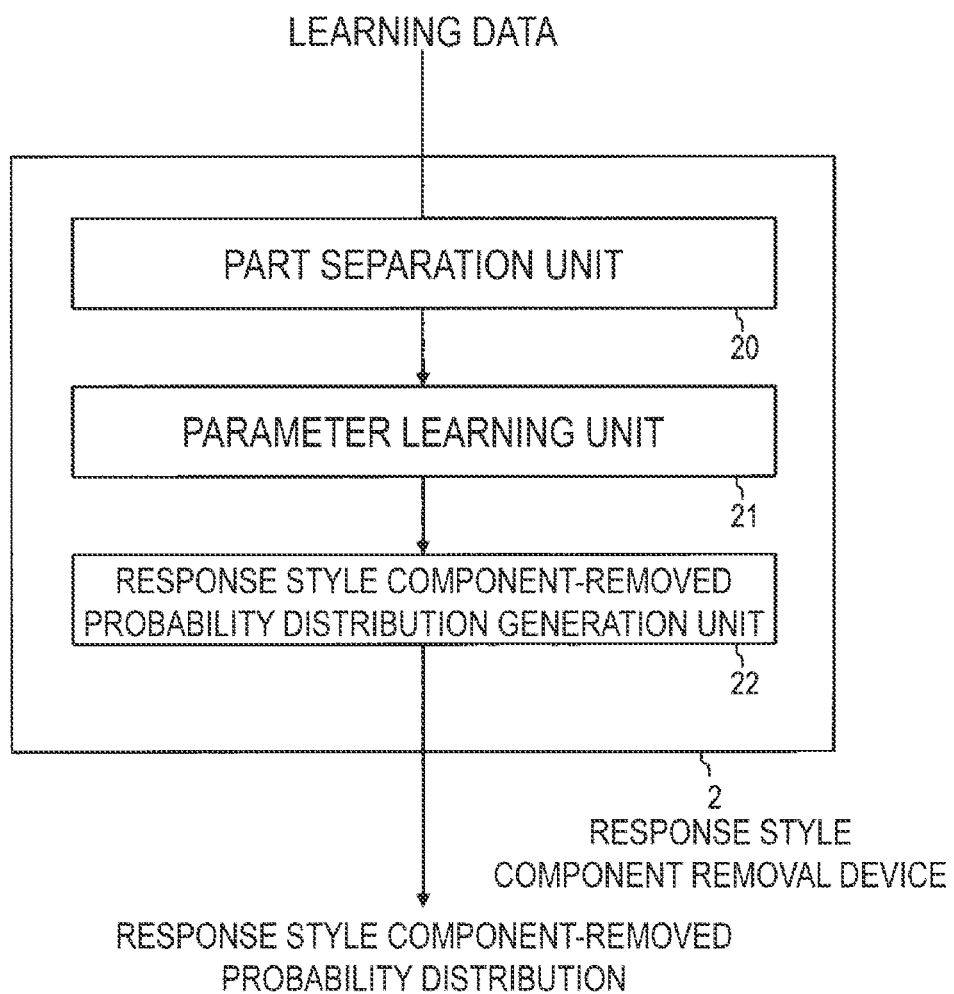
FIG. 3 is a block diagram illustrating a configuration of a response style component removal device according to Embodiment 2.
Figure 4:
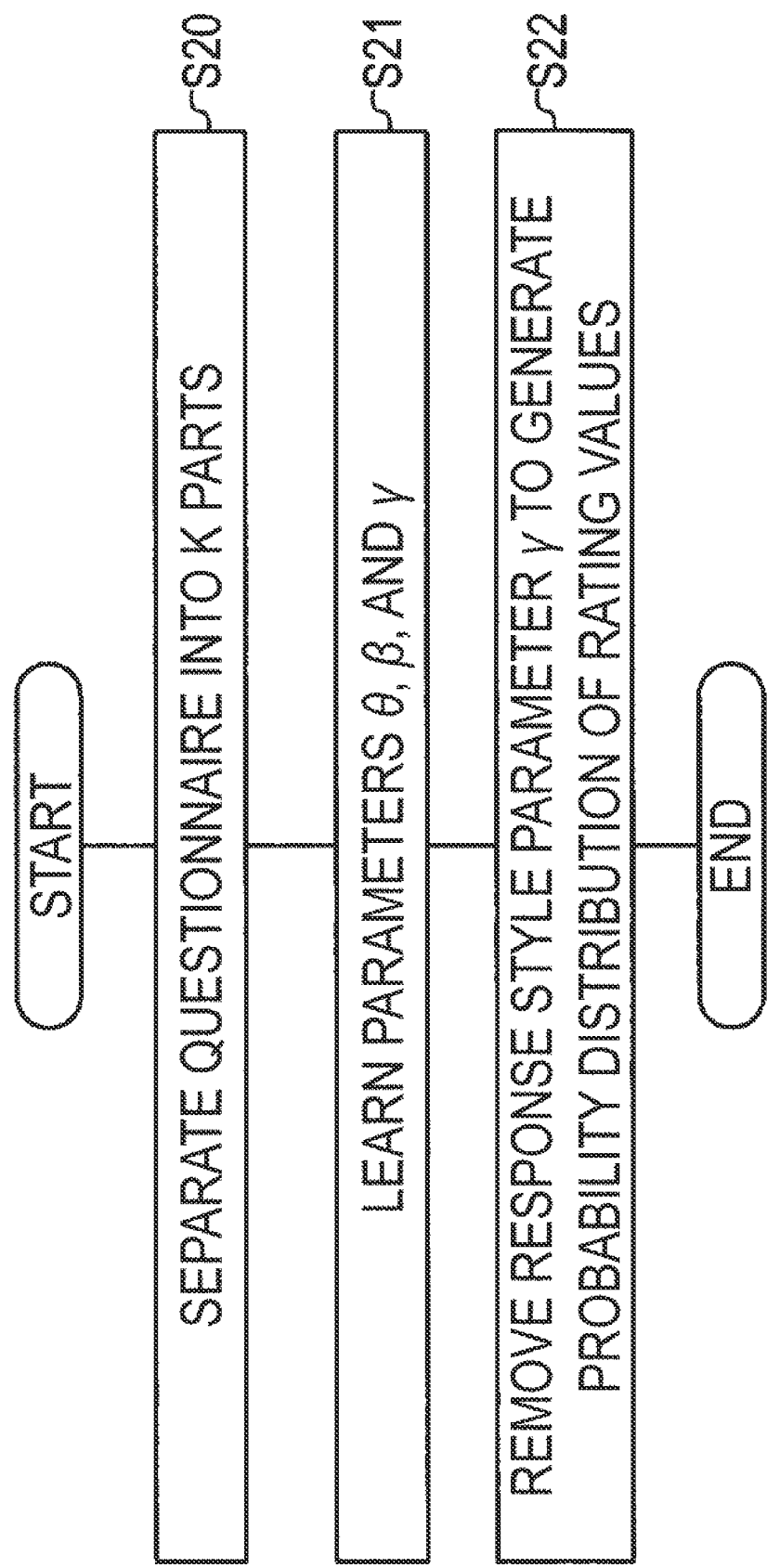
FIG. 4 is a flowchart illustrating an operation of the response style component val device according to Embodiment 2.

Hereinafter, a configuration of a response style component removal device of Embodiment 2 will be described with reference to FIG. 3. As illustrated in FIG. 3, the response style component removal device 2 of the present embodiment includes a part separation unit 20, a parameter learning unit 21, and a response style component-removed probability distribution generation unit 22. Hereinafter, an operation of each component will be described with reference to FIG. 4.

The part separation unit 20 separates the questionnaire into K parts (K is an integer equal to or greater than 2) (S20). This process may be performed manually in advance.

The parameter learning unit 21 uses, as learning data, rating values for the plurality of question items from a plurality of raters who have rated all of the questionnaire including K parts (K is an integer equal to or greater than 2) each including the plurality of question items to learn a rater parameter $\theta_k$ that depends on at least an index k (k=1, . . . , K) of each part of the questionnaire and indicates a tendency of each rater, an item parameter $\beta_k$ that depends on at least the index k of each part of the questionnaire and indicates a tendency of each question item, and a response style parameter $\gamma$ that does not depend on at least the index k of each part of the questionnaire and indicates a tendency of a response style, the rater parameter $\theta_k$, the item parameter $\beta_k$, and the response style parameter $\gamma$ being parameters describing the rating values (S21).

The response style component-removed probability distribution generation unit 22 removes, among the rater parameter $θ_k$, the item parameter $β_k$, and the response style parameter $γ$ that have been learned, the response style parameter $γ$ to generate a probability distribution of the rating values (S22), Effects According to the response style component removal devices 1 and 2 described in the embodiments, it is possible to estimate a response style of each individual (a tendency of selecting a specific category such as an extreme (both ends) rating value or a middle rating value regardless of content to be evaluated) without depending on a type of questionnaire.

Further, according to the response style component removal devices 1 and 2 described in the embodiments, it is possible to further estimate the response of the individual in a case in which the response style has been removed.

SUPPLEMENTS

The device of the present invention, for example, as a single hardware entity, includes an input unit to which a keyboard or the like can be connected, an output unit to which a liquid crystal display or the like can be connected, a communication unit to which a communication device (for example, a communication cable) capable of communicating with the outside of the hardware entity can be connected, a central processing unit (CPU, which may include a cache memory, a register, or the like), a RAM or ROM that is a memory, an external storage device that is a hard disk, and a bus that connects the input unit, the output unit, the communication unit, the CPU, the RAM, the ROM, and the external storage device so that data can be exchanged therebetween. Further, a device (drive) capable of reading and writing data in a recording medium such as a CD-ROM may be provided in the hardware entity, as necessary. An example of a physical entity including such hardware resources includes a general-purpose computer.

Programs required for implementing the above-described functions, data required for processing the programs, and the like are stored in the external storage device of the hardware entity (the present invention is not limited to an external storage device, and for example, the programs may be read out and stored in a ROM, which is a dedicated storage device). Further, data and the like obtained by the processing of the programs is appropriately stored in a RAM, an external storage device, or the like.

In the hardware entity, each program stored in the external storage device (or ROM or the like) and the data necessary for processing each program are read into a memory as necessary, and are appropriately interpreted, executed, and processed by the CPU. As a result, the CPU implements a predetermined function (each component represented by the term " . . . unit", " . . . means", or the like described above).

The present invention is not limited to the above-described embodiments, and can be appropriately changed without departing from the spirit of the present invention. Further, the processing described in the embodiments may be not only executed in chronological order according to a describing order, but may also be executed in parallel or individually according to the processing capability of a device that executes the processing or necessity.

As described above, when a processing function in the hardware entity (the device of the present invention) described in the above embodiment is implemented by a computer, processing content of functions that the hardware entity needs to have are described by a program. A processing function in the above hardware entity is implemented on the computer by executing this program on the computer.

Figure 5:
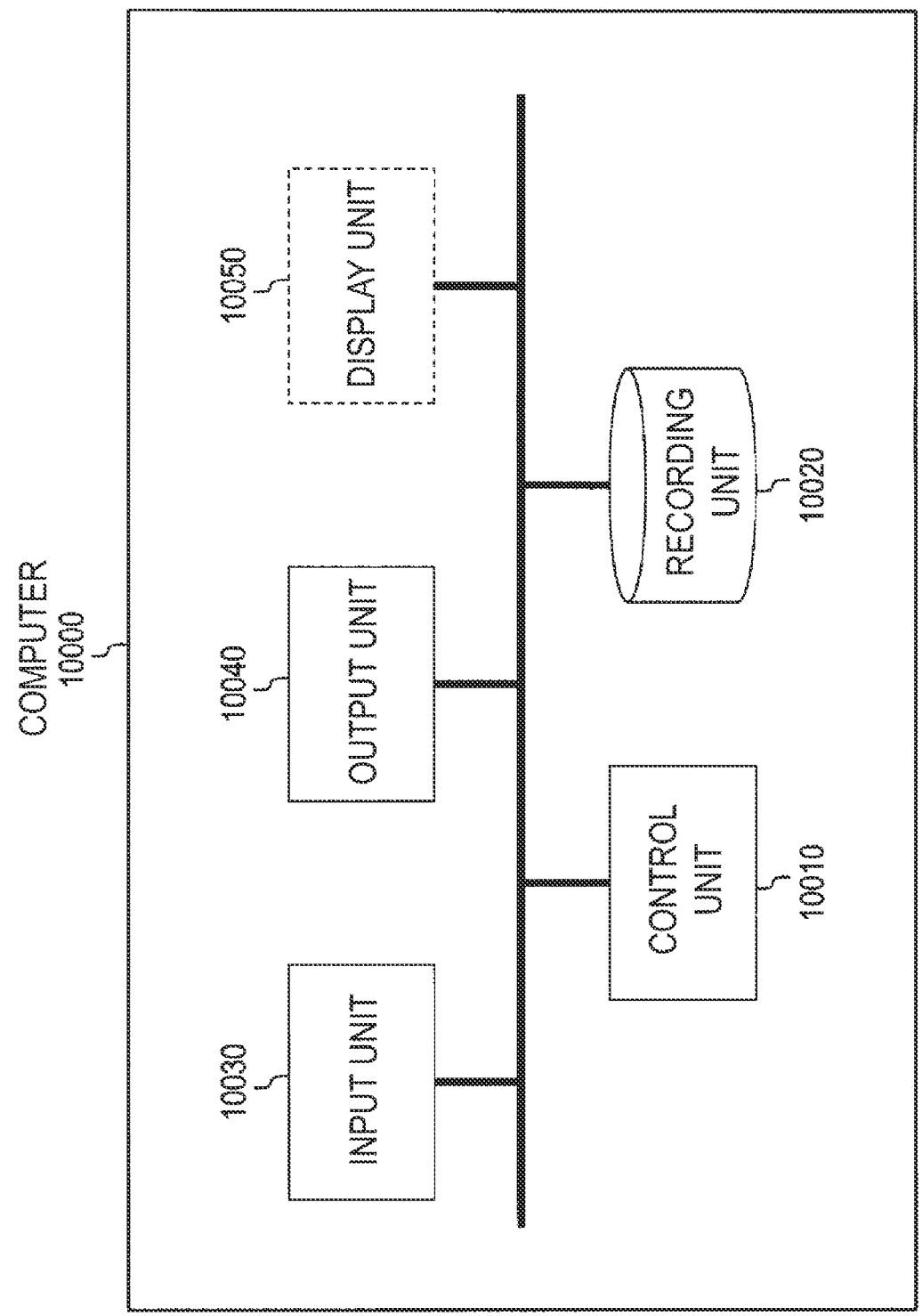
FIG. 5 is a diagram illustrating an example of a functional configuration of a computer.

The various types of processing described above can be performed by causing a recording unit 10020 of the computer illustrated in FIG. 5 to read a program for executing each of steps of the above method and causing a control unit 10010, an input unit 10030, an output unit 10040, and the like to execute the program.

A program in which processing content thereof has been described can be recorded on a computer-readable recording medium. The computer-readable recording medium may be, for example, a magnetic recording device, an optical disc, a magneto-optical recording medium, or a semiconductor memory. Specifically, for example, a hard disk device, a flexible disk, a magnetic tape, or the like can be used as the magnetic recording device, a digital versatile disc (DVD), a DVD-random access memory (RAM), a compact disc read only memory (CD-ROM), CD-R (Recordable)/RW (ReWritable), or the like can be used as the optical disc, a magneto-optical disc (MO) or the like can be used as the magneto-optical recording medium, and an electrically erasable and programmable-read only memory (EEPROM) or the like can be used as the semiconductor memory.

Further, distribution of this program is performed, for example, by selling, transferring, renting a portable recording medium such as a DVI) or CD-ROM on which the program has been recorded. Further, the program may be stored in a storage device of a server computer and distributed by being transferred from the server computer to another computer via a network.

The computer that executes such a program first temporarily stores, for example, the program recorded on the portable recording medium or the program transferred from the server computer in a storage device of the computer. When the computer executes the process, the computer reads the program stored in the recording medium of the computer and executes a process according to the read program. Further, as another embodiment of the program, the computer may directly read the program from the portable recording medium and execute a process according to the program, and further, a process according to a received program may be sequentially executed each time the program is transferred from the server computer to the computer. Further, a configuration may be adopted in which the above-described process is executed by a so-called application service provider (ASP) type service in which a processing function is implemented by only instructing an execution and acquiring a result without transfer of the program from the server computer to the computer. It is assumed that the program in the present embodiment includes information provided for a process of an electronic calculator and being pursuant to the program (such as data that is not a direct command to the computer, but has properties defining a process of the computer).

Further, although the hardware entity is configured by a predetermined program being executed on the computer in the present embodiment, at least a part of the processing content of the hardware entity may be achieved by hardware.

The invention claimed is:

1. A response style component removal device comprising a processor configured to execute operations comprising:

retrieving a plurality of answers as training data, wherein the plurality of answers comprises a selected answer choice of a plurality of answer choices in a respective training question item of a plurality of training question items in a respective training questionnaire of the plurality of training questionnaires;

training a machine learning model comprising a Bayesian generative model, by, using the training data, the training data comprises the selected answer choice as a ground truth rating value for the respective training question item of the plurality of training question items from a first plurality of raters who have rated K types of training questionnaires (K is an integer equal to or greater than 2), the training the machine learning model further comprises updating, for each of the K types of training questionnaires including the plurality of training question items, a plurality of parameters of the machine learning model, the plurality of parameters comprises:

a rater parameter $\theta_k$ that depends on at least an index k (k=1, ..., K) of each training questionnaire and indicates a tendency of each rater, an item parameter $\beta_k$ that depends on at least the index k of each training questionnaire and indicates a tendency of each training question item, and a response style parameter $\gamma$ that does not depend on at least the index k of each training questionnaire and indicates a tendency of a response style as having no dependency on the plurality of training questionnaires, the rater parameter $\theta_k$, the item parameter $\beta_k$, and the response style parameter $\gamma$ respectively describe the ground truth rating value, and the response style parameter $\gamma$ indicates a tendency of the rater selecting either one of extreme ends or a center of answer choices of the plurality of training question items in the plurality of training questionnaires irrespective of content of respective answer choices and respective training question items;

receiving questionnaire data, wherein the questionnaire data comprises a questionnaire rating value of a respective question item of a questionnaire;

updating the trained machine learning model by removing the trained response style parameter $\gamma$ from the plurality of parameters; and generating, by the updated trained machine learning model, a probability distribution of the questionnaire rating value, based on the trained rater parameter $\theta_k$ and the trained item parameter $\beta_k$, without the trained response style parameter $\gamma$, wherein the generated probability distribution of the questionnaire rating value indicates a probability distribution without the tendency of the response style of the rater irrespective of content of respective answer choices and respective question items.

2. The response style component removal device of claim 1, wherein the training further comprises, training, using the ground truth rating value for a plurality of training question items from a second plurality of raters who have rated the respective training questionnaire including N parts (N is an integer equal to or greater than 2), each of the N parts including the plurality of training question items;

a rater parameter $\theta_n$ that depends on at least an index n (n=1, ..., N) of each part of the training questionnaire and indicates a tendency of each rater, an item parameter $\beta_n$ that depends on at least the index n of each part of the training questionnaire and indicates a tendency of each training question item, and wherein the response style parameter $\gamma$ that does not depend on at least the index n of each part of the training questionnaire and indicates the tendency of the response style, the rater parameter $\theta_n$, the item parameter $\beta_n$, and the response style parameter $\gamma$ being parameters describing the ground truth rating value.

3. The response style component removal device of claim 2, wherein the first plurality of raters and the second plurality of raters are different.

4. The response style component removal device of claim 2, the first plurality of raters and the second plurality of raters are substantially similar.

5. The response style component removal device of claim 2, wherein the second plurality of raters who have rated all of the questionnaire.

6. The response style component of claim 2, wherein the questionnaire is separated into N parts using a part separation unit.

7. The response style component removal device of claim 1, wherein the first plurality of raters who have rated all of the K types of questionnaires.

8. The response style component of claim 1, wherein the questionnaire rating value is estimated according to the generated probability distribution.

9. The response style component of claim 8, wherein a categorical distribution is used to estimate the questionnaire rating value.

10. The response style component of claim 1, wherein the questionnaire rating value represents a discrete value.

11. A response style component removal method comprising:

retrieving a plurality of answers as training data, wherein the plurality of answers comprises a selected answer choice of a plurality of answer choices in a respective training question item of a plurality of training question items in a respective training questionnaire of the plurality of training questionnaires;

training a machine learning model comprising a Bayesian generative model, by, using the training data, the training data comprises the selected answer choice as a ground truth rating value for the respective training question item of the plurality of training question items from a plurality of raters who have rated K types of training questionnaires (K is an integer equal to or greater than 2), the training the machine learning model further comprises updating, for each of the K types of training questionnaires including the plurality of training question items, a plurality of parameters of the machine learning model, the plurality of parameters comprises:

a rater parameter $\theta_k$ that depends on at least an index k (k=1, ..., K) of each training questionnaire and indicates a tendency of each rater, an item parameter $\beta_k$ that depends on at least the index k of each training questionnaire and indicates a tendency of each training question item, and a response style parameter $\gamma$ that does not depend on at least the index k of each training questionnaire and indicates a tendency of a response style as having no dependency on the plurality of training questionnaires, the rater parameter $\theta_k$, the item parameter $\beta_k$, the response style parameter $\gamma$ respective describe the ground truth rating value, and the response style parameter $\gamma$ indicates a tendency of the rater selecting either one of extreme ends or a center of answer choices of the plurality of training question items in the plurality of training questionnaires irrespective of content of respective answer choices and respective training question items;

receiving questionnaire data, wherein the questionnaire data comprises a questionnaire rating value of a respective question item of a questionnaire;

updating the trained machine learning model by removing the trained response style parameter $\gamma$ from the plurality of parameters; and generating, by the updated trained machine learning model, a probability distribution of the questionnaire rating value, based on the trained rater parameter $\theta_k$ and the trained item parameter $\beta_k$, without the trained response style parameter $\gamma$, wherein the generated probability distribution of the questionnaire rating value indicates a probability distribution without the tendency of the response style of the rater irrespective of content of respective answer choices and respective question items.

12. The response style component removal method of claim 11, wherein the first plurality of raters who have rated all of the K types of questionnaires.

13. The response style component removal method of claim 11, wherein the questionnaire rating value is estimated.

14. The response style component removal method of claim 13, wherein a categorical distribution is used to estimate the questionnaire rating value.

15. The response style component removal method of claim 11, wherein the questionnaire rating value represents a discrete value.

16. A response style component removal method comprising:

retrieving a plurality of answers as training data, wherein the plurality of answers comprises a selected answer choice of a plurality of answer choices in a respective question item of a plurality of question items in a respective training questionnaire of the plurality of training questionnaires:

training a machine learning model comprising a Bayesian generative model, by using the training data, the training data comprises the selected answer choice as a ground truth rating value for the respective question item of the plurality of question items from a plurality of raters who have rated a training questionnaire including K parts (K is an integer equal to or greater than 2), the training the machine learning model further comprises updating, each of the K parts including the plurality of question items, a plurality of parameters of the machine learning model, the plurality of parameters comprises:

a rater parameter $\theta_k$ that depends on at least an index k (k=1, . . . , K) of each part of the training questionnaire and indicates a tendency of each rater, an item parameter $\beta_k$ that depends on at least the index k of each part of the training questionnaire and indicates a tendency of each question item, and a response style parameter $\gamma$ that does not depend on at least the index k of each part of the training questionnaire and indicates a tendency of a response style as having no dependency on the plurality of training questionnaires, the rater parameter $\theta_k$, the item parameter $\beta_k$, and the response style parameter $\gamma$ respectively describe the ground truth rating value, and the response style parameter y indicates a tendency of the rater selecting either one of extreme ends or a center of answer choices of the plurality of question items in the plurality of training questionnaires irrespective of content of respective answer choices and respective question items;

receiving questionnaire data, wherein the questionnaire data comprises a questionnaire rating value of a respective question item of a questionnaire;

updating the trained machine learning model by removing the trained response style parameter $\gamma$ from the plurality of parameters; and generating, by the updated trained machine learning model, a probability distribution of the questionnaire rating value by removing, based on the trained rater parameter $\theta_k$ and the trained item parameter $\beta_k$, without the trained response style parameter $\gamma$, wherein the generated probability distribution of the questionnaire rating value indicates a probability distribution without the tendency of the response style of the rater irrespective of content of the respective answer choices and respective question items.

17. The response style component removal method of claim 16, wherein the plurality of raters who have rated all of the questionnaire.

18. The response style component removal method of claim 16, further comprising separating the questionnaire into K parts.

19. The response style component removal method of claim 16, wherein the questionnaire rating value is estimated according to the generated probability distribution.

20. The response style component removal method of claim 19, wherein a categorical distribution is used to estimate the questionnaire rating value.

* * * * *